Nov. 10, 1959

G. C. TIBBETTS 2,912,605

ELECTROMECHANICAL TRANSDUCER

Filed Dec. 5, 1955

Inventor
George C. Tibbetts
by Roberts, Cushman & Grover
Attys

United States Patent Office 2,912,605
Patented Nov. 10, 1959

2,912,605

ELECTROMECHANICAL TRANSDUCER

George C. Tibbetts, Camden, Maine, assignor to Tibbetts Laboratories, Inc., Camden, Maine, a corporation of Maine Application December 5, 1955, Serial No. 551,110

7 Claims. (Cl. 310—9.1)

This invention relates to electromechanical transducers such as piezoelectric devices having vibrating diaphragms, and more particularly relates to means for controlling or damping the vibration of the diaphragm as a function of frequency.

One type of piezoelectric device, shown in my United States Patent 2,403,692, comprises a plate of piezoelectric material such as Rochelle salt. Arched diaphragms are adhered on opposite sides of the piezoelectric plate covering the plate from edge to edge. As is well known in the art, mechanical vibrations applied through the diaphragm along an edgewise axis of the plate are converted by the plate into electrical variations between electrodes on opposite sides of the plate. Conversely electrical variations may be converted into mechanical variations.

Such a device has many applications, one example being its use as a phonographic pickup wherein the device converts needle vibrations in the audible range into audio frequency voltages. In this and like applications it is usually highly desirable that the device be responsive to all frequencies within the range concerned without excessive variations at particular frequencies within the range. In other applications it may be desirable to merely control the response at various portions of the frequency range.

Thus a principal object of the present invention is to provide means for controlling or modifying the frequency response of the above-described diaphragm actuated device.

According to the invention the piezoelectric device comprises a plate which expands and contracts along an edgewise axis when subjected to electrostatic forces, a diaphragm extending across one side of the plate from edge to edge, means connecting the diaphragm to the plate at said edges, the diaphragm being arched relative to said axis so that when the plate rapidly expands and contracts along said axis the diaphragm vibrates in response according to the frequency of plate expansion, and the diaphragm including a damper portion of increased thickness at least partly coextensive with an area of the diaphragm whereby the natural frequency response of the device is modified. As previously explained it may be the diaphragm which vibrates in response to expansion and contraction of the piezoelectric plate or it may be that the plate vibrates in response to vibration of the diaphragm. In either case the diaphragm naturally tends to set up standing wave patterns of vibration which depend on the frequency, or range of frequencies imposed upon it. Preferably the portion or portions of increased thickness cover areas in which the curvatures or second derivatives of the vibration amplitude, with respect to directions lying in the diaphragm surface, are large compared to those in other areas, for a given standing wave pattern which it is desired to suppress or attenuate.

Preferably the damper portion or portions are symmetrically distributed with respect to one or more axes of symmetry of the diaphragm, if such exist. Preferably the damper portion comprises a portion of plasticized organic material attached to the diaphragm, which flexes and hence dissipates energy when the diaphragm vibrates.

For the purpose of illustration typical embodiments of the invention are shown in the accompanying drawing in which—

Figure 1:
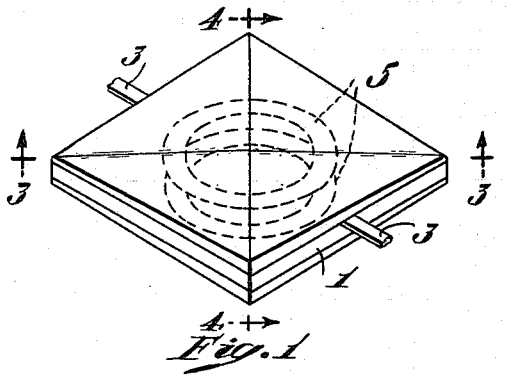
Fig. 1 is an isometric view of an assembled piezoelectric device.
Figure 2:
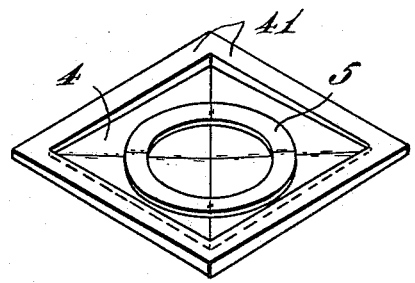
Fig. 2 is an isometric view of a diaphragm having one form of damper.
Figure 3:
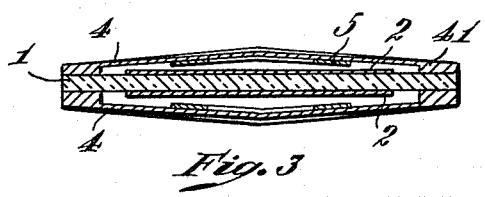
Figure 4:
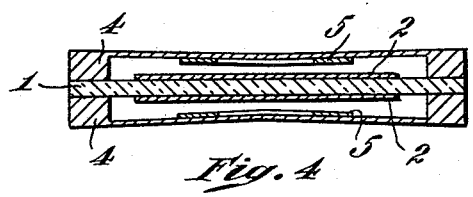
Figure 5:
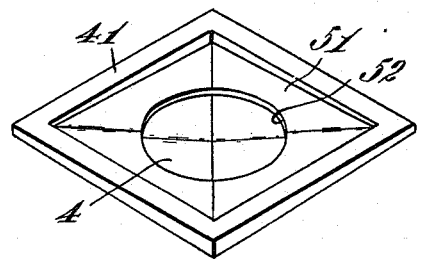
Figure 6:
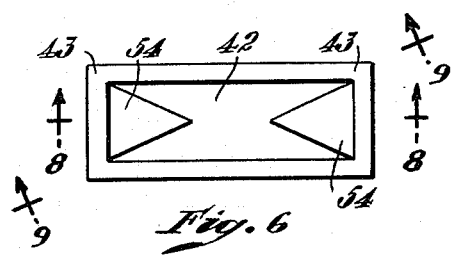
Figure 8:
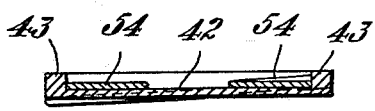
Figure 7:
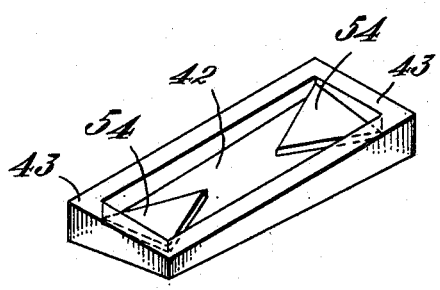

Figs. 3 and 4 are sections on lines 3—3 and 4—4 of Fig. 1;

Fig. 5 is an isometric view of a diaphragm having another form of damper;

Fig. 6 is a plan view of an elongate, rectangular diaphragm having still another form of damper;

Fig. 7 is an isometric view of the diaphragm of Fig. 6;

Fig. 8 is a section on line 8—8 of Fig. 6; and

Figure 9:
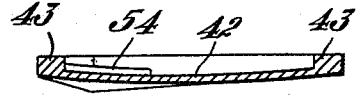

Fig. 9 is a section on line 9—9 of Fig. 6.

As shown in Figs. 1 to 4 the piezoelectric device comprises a flat slab or plate 1 carrying electrodes 2 of metal foil such as gold and leads 3 connected to the foil and extending beyond the edges of the plate. On opposite sides of the plate 1 diaphragms 4 are attached at their rims or edges 41 along the edges of the plate by an adhesive. As fully set forth in my United States Patent 2,403,692 the diaphragms 4 are arched along the two mechanical axes of the plate 1 which coincide with the section lines 3—3 and 4—4, the diaphragm being outwardly arched along the axis 3—3 and inwardly arched along the axis 4—4.

An undamped diaphragm actuated device as so far described has a tendency to poor frequency response as a result of a natural characteristic which sets up standing waves of the vibration of the diaphragm, having widely changing patterns as the frequency of vibration is changed. Hence the sensitivity at various frequencies within the operating frequency range may be either depressed or exaggerated so that the over-all response of the device throughout the operating frequency range varies considerably. Whereas exaggeration or peaking at certain frequencies is not wholly undesirable, a depression or a tendency to null is highly undesirable and may be eliminated or controlled to the great advantage of the over-all response characteristic of the device.

According to the present invention the peaks and depressions in the diaphragm actuated response characteristic may be eliminated or controlled by attaching to the active surface of the diaphragm a damper which effectively dissipates mechanical energy into the form of heat in selected areas of the standing wave pattern or patterns which are to be controlled. As shown in Figs. 1 to 4 the damper comprises a ring 5 of soft plasticized plastic sheet material such as Viscoloid which is cemented to the inner face of the diaphragm 4. While the ring-shaped damper is shown spaced from the rims or edges 41 of the diaphragm, an enlarged ring abutting the edges may be advantageously used.

As shown in Fig. 5 a modified damper 51 has a rectangular outline and a circular opening 52. The outer edges of the damper 51 abut the edges 41 of the diaphragm.

In Figs. 6 to 9 is shown an elongate, rectangular diaphragm 42 having edges 43 like the edges 41 of Figs. 1 to 4. With such an elongate, rectangular diaphragm the character of the standing wave patterns apparently is modified such that it is oftentimes desirable to control standing waves extending lengthwise of the diaphragm without heavily damping standing waves extending along the width of the diaphragm. For this purpose triangular sheets 54 of Viscoloid are cemented to the diaphragm with their bases abutting the end edges 43 of the diaphragm and their apices directed toward the center of the diaphragm.

In the embodiments illustrated, the damper portions have been kept from proximity to the center of the diaphragm, at which the amplitude of vibration at low frequencies is the greatest. This minimizes the effect of the mass loading of the damper on the fundamental resonant frequency of the device, which is an important parameter in the design of most devices of this sort. However it may be desirable to employ deliberately the damper portions both as damping means and as mass loading means, the latter for the purpose of depressing in differing degrees the frequency positions of the peaks and depressions in the frequency response. For example it has been found advantageous for some designs to employ a damper sheet covering entirely the active surface of the diaphragm, in which case the damper serves both to attenuate and to reduce the frequency positions of all peaks and depressions in the natural frequency response of the device.

It should be understood that the present invention is not limited to any one of the embodiments illustrated herein but includes all modifications and equivalents. For example, the damper may be located either inside the diaphragm as shown in Figs. 1 to 8 or outside.

I claim:

1. A piezoelectric device comprising a plate which expands and contracts along an edgewise axis when subjected to electrostatic forces, a diaphragm extending across one side of the plate from edge to edge, means connecting the diaphragm to the plate at said edges, the diaphragm being arched relative to said axis so that when the plate rapidly expands and contracts along the axis the diaphragm vibrates in response according to the frequency of plate expansion, and a sheet of flexible material fast to the diaphragm throughout at least a part of the vibrating area of the diaphragm intermediate said edges, thereby to modify the frequency response of the device.

2. A piezoelectric device comprising a plate which expands and contracts along an edgewise axis when subjected to electrostatic forces, a diaphragm extending across one side of the device from edge to edge, means connecting the diaphragm to the plate at said edges, the diaphragm being arched in said direction so that when the plate rapidly expands and contracts along said axis the diaphragm in response vibrates so as naturally to exhibit a standing wave pattern dependent on the frequency of plate expansion, and a sheet of plasticized organic material cemented to the diaphragm throughout at least a part of the vibrating area of the diaphragm exhibiting said standing wave pattern, thereby to modify the frequency response of the device.

3. A piezoelectric device comprising a plate which expands and contracts along an edgewise axis when subjected to electrostatic forces, a diaphragm extending across one side of the device from edge to edge, means connecting the diaphragm to the plate at said edges, the diaphragm being arched in said direction so that when the plate rapidly expands and contracts along said axis the diaphragm in response vibrates so as naturally to exhibit a standing wave pattern dependent on the frequency of plate expansion, and a sheet of flexible material fast to the diaphragm throughout at least a part of the vibrating area of the diaphragm exhibiting said standing wave pattern, thereby to modify the natural frequency response of the device.

4. A piezoelectric device according to claim 1 characterized in that said diaphragm portion comprises a damper of soft, plasticized plastic adhered to said diaphragm.

5. A piezoelectric device according to claim 1 characterized in that said damping portion forms a circular opening at the central portion of the diaphragm.

6. A piezoelectric device comprising a plate which expands and contracts along an edgewise axis when subjected to electrostatic forces, a square diaphragm extending across one side of the device from edge to edge, means connecting the diaphragm to the plate at said edges, the diaphragm being arched in said direction so that when the plate rapidly expands and contracts along said axis the diaphragm in response vibrates so as naturally to exhibit a standing wave pattern dependent on the frequency of plate expansion, and a damper of soft plasticized sheet plastic having a circular opening therethrough and adhered with its outer edges abutting said diaphragm connecting means and with said circular opening substantially concentric with the center of the diaphragm, thereby to modify the natural frequency response of the device.

7. A piezoelectric device according to claim 1 characterized in that said plate and diaphragm are of elongate rectangular shape and said damping portions are of triangular shape with their apices directed away from the narrow ends of the diaphragm toward the center of the diaphragm.

References Cited in the file of this patent
UNITED STATES PATENTS

| | | |
|---|---|---|
| 2,270,167 | Meissner | Jan. 13, 1942 |
| 2,386,279 | Tibbetts | Oct. 9, 1945 |
| 2,403,692 | Tibbetts | July 9, 1946 |
| 2,477,596 | Gravley | Aug. 2, 1949 |
| 2,487,962 | Arndt | Nov. 15, 1949 |
| 2,607,858 | Mason | Aug. 19, 1952 |
| 2,810,082 | Tibbetts | Oct. 15, 1957 |